No. 778,138. PATENTED DEC. 20, 1904.
G. E. MUTH & F. S. CULP.
CORN PLANTER.
APPLICATION FILED MAY 9, 1904.
NO MODEL.
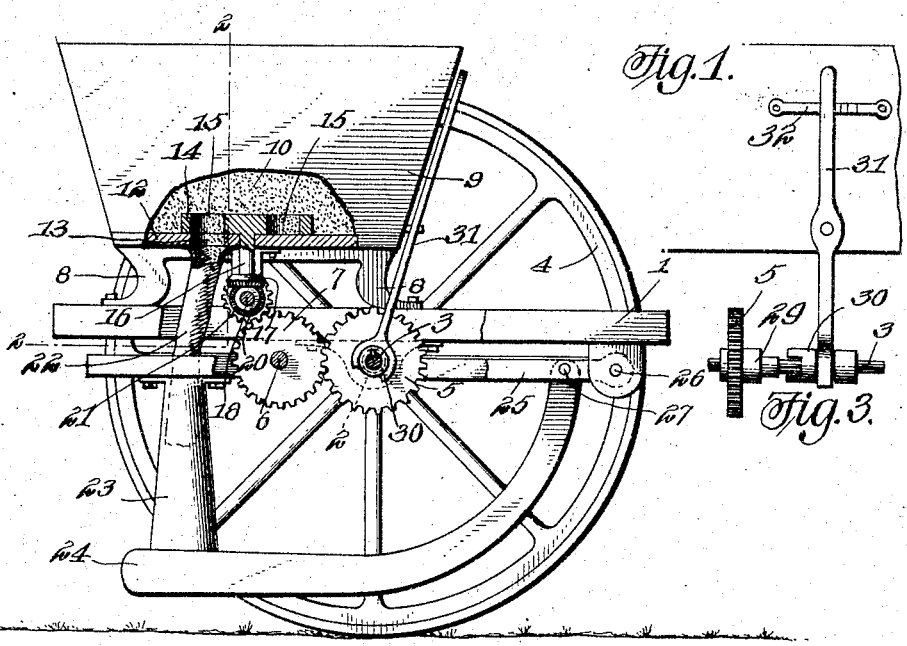
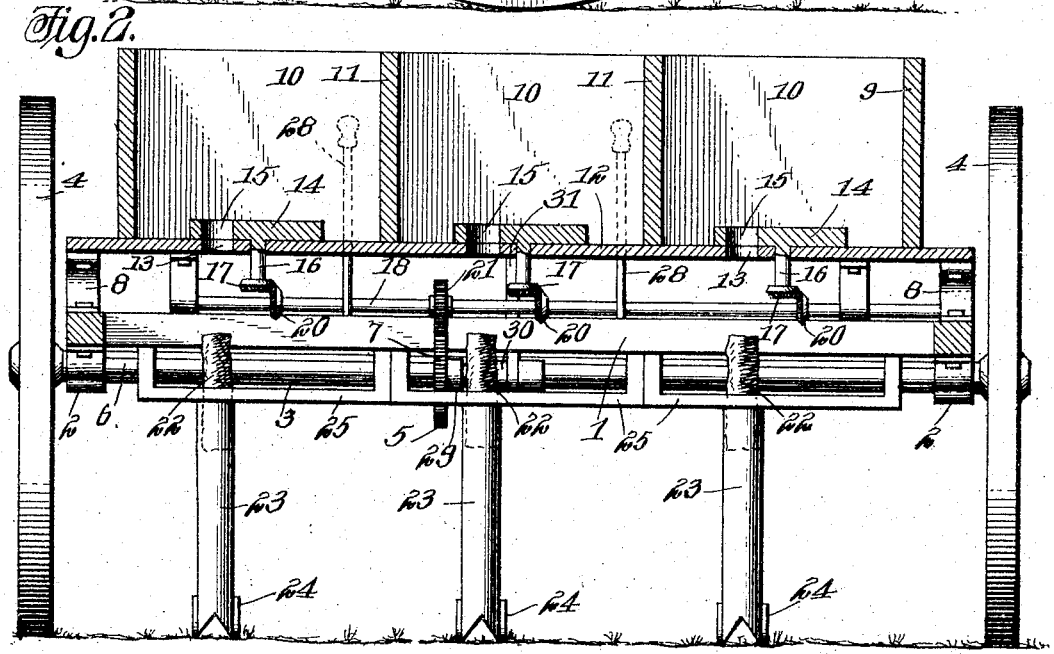
G. E. Muth and F. S. Culp, Inventors No. 778,138.　　　　　　　　　　　　　　　　　Patented December 20, 1904.

UNITED STATES PATENT OFFICE.

GEORGE EDWARD MUTH AND FRANK SYLVESTER CULP, OF MANSFIELD, OHIO.

CORN-PLANTER.

SPECIFICATION forming part of Letters Patent No. 778,138, dated December 20, 1904.

Application filed May 9, 1904. Serial No. 207,146.

*To all whom it may concern:*

Be it known that we, GEORGE EDWARD MUTH and FRANK SYLVESTER CULP, citizens of the United States, residing at Mansfield, in the county of Richland and State of Ohio, have invented certain new and useful Improvements in Corn-Planters; and we do declare the following to be a full, clear, and exact description of the invention, such as will enable others skilled in the art to which it appertains to make and use the same.

Our invention is an improved corn-planter; and it consists in the construction, combination, and arrangement of devices hereinafter described and claimed.

In the accompanying drawings, Figure 1 is partly a side elevation and partly a sectional view of a corn-planter embodying our improvements. Fig. 2 is partly a rear elevation and partly a transverse sectional view of the same, taken on the plane indicated by the line 2 2 of Fig. 1. Fig. 3 is a detail view of means to throw the seeding mechanism in and out of gear.

The frame 1 is provided with bearings 2 for an axle-shaft 3, on which are the ground-wheels 4. Said shaft is further provided with a spur-gear 5. At a suitable distance in rear of the axle-shaft is a shaft 6, on which is an idle gear 7, that engages the gear 5. On the ends of the frame 1 are standards 8 of suitable size and shape, which support a seed or grain box 9. The latter is here shown as divided into compartments 10 by partitions 11, and its bottom part 12 is provided with discharge-openings 13. In the bottom of each compartment is a revoluble seed wheel or plate 14, having a suitable number of openings 15, which may be of any suitable size, according to the desired number of grains of corn to be planted in each hill. By having the openings 15 appropriately spaced apart the hills may be planted at any desired distance apart, as may be understood, and by having the said openings sufficiently near together the corn may be dropped in drills. Each seed wheel or plate is provided with a depending axle-stud 16, having at its lower end a miter-gear 17. A shaft 18 just under the seedbox is journaled in suitable bearing-brackets that depend therefrom and is provided with miter-gears 20, which engage similar gears 17. On the said shaft 18 there is also a spur-gear 21, which engages the gear 7, and hence said shaft 18 and the seed plates or wheels are rotated when the machine is in motion, as will be understood. Flexible seed-spouts 22, which may be made of rubber, leather, canvas, or other suitable flexible material, depend from the seedbox and are so disposed that the discharge-openings 13 thereof discharge seeds thereinto. Seed-tubes 23 are carried by shoes or furrow-openers 24, which serve to open the furrows or drills for the reception of the seeds. The upper ends of the said seed-tubes are secured to the under rear sides of the frames or drag-bars 25, which frames have their front ends pivotally connected to the main frame, as at 26. The front upturned ends of the shoes 24 are attached to the said frames 26, as at 27. The lower ends of the flexible seed-spouts project into the seed-tubes, so that the seeds discharged from the spouts fall into and through the seed-tubes and are guided thereby into the drill, as will be understood.

Levers 28 are provided which are connected to the respective frames 25 and enable the latter to be independently raised or lowered, so that either of the shoes and its seed-tubes may be raised to enable the same to pass over a stone or stump or other obstruction, and hence avoid turning the machine in order to clear the same. This enables the machine to be driven in a straight line under all conditions, and hence enables the corn to be planted in check-rows.

The gear 5 is loose on the shaft 3 and has a clutch member 29. A clutch member 30 is splined on the said shaft and is operated by a hand-lever 31 to engage and disengage the gear 5, as may be desired, to throw the seeding mechanism in or out of gear.

Having thus fully described our invention, what we claim as new, and desire to secure by Letters Patent, is—

A corn-planter comprising a main frame, an axle-shaft having bearings secured to the main frame, ground-wheels on the axle-shaft, a gear-wheel loose on the said shaft and having a clutch member, a clutch member splined on the said shaft, a counter-shaft having its bearings secured to the main frame and having an idle gear engaging the first-mentioned gear, a seedbox on the main frame, a lever fulcrumed to the seedbox and connected to the splined clutch member to throw the latter into and out of gear with the other clutch member, revoluble seed-plates in the bottom of the seedbox and having depending axle-studs provided with miter-gears, and a shaft journaled in bearings under the seedbox, having miter-gears engaging those of the seed-plates and further provided with a gear which engages the idle gear, substantially as described.

In testimony whereof we have hereunto set our hands in presence of two subscribing witnesses.

GEORGE EDWARD MUTH.
FRANK SYLVESTER CULP.

Witnesses:
WM. F. VAEGELE, Jr.,
OLIN M. FARBER.